No. 840,372. PATENTED JAN. 1, 1907.
L. J. RECKENDORFER.
ERASER TIP FOR LEAD PENCILS.
APPLICATION FILED JULY 13, 1906.
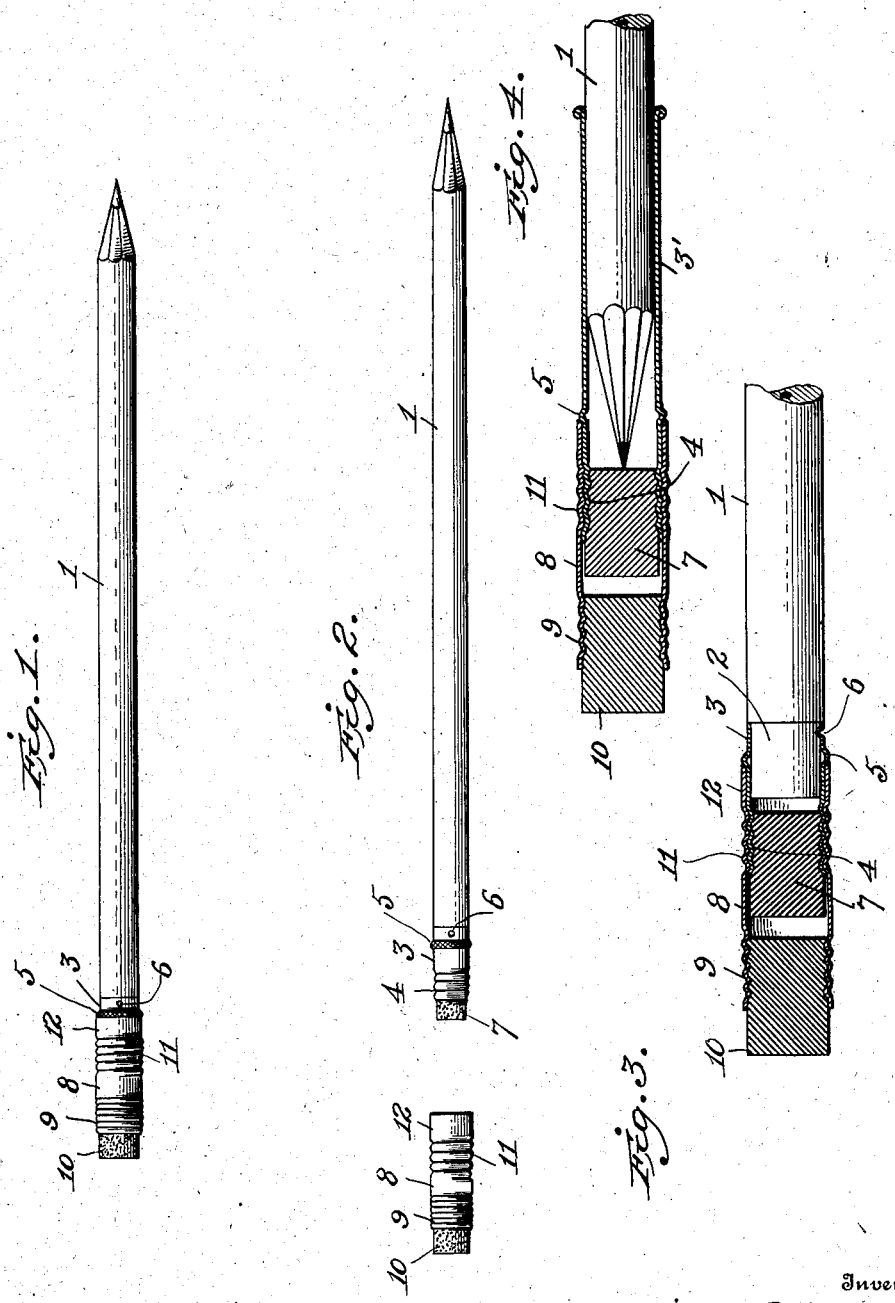

UNITED STATES PATENT OFFICE.

LOUIS J. RECKENDORFER, OF NEW YORK, N. Y.

ERASER-TIP FOR LEAD-PENCILS.

No. 840,372. Specification of Letters Patent. Patented Jan. 1, 1907.

Application filed July 13, 1906. Serial No. 326,128.

*To all whom it may concern:*

Be it known that I, LOUIS J. RECKENDORFER, a citizen of the United States, and a resident of New York, in the county of New York and State of New York, have invented certain new and useful Improvements in Eraser-Tips for Lead-Pencils, of which the following is a specification.

This invention has reference to improvements in eraser-tips for lead-pencils; and its object is to provide a pencil with a supplemental eraser-tip in addition to the usual one, which supplemental tip serves as a protector for the first tip.

The invention consists in providing for the lead-pencil a metallic ferrule, which may be either fast on it or which may be a removable point-protector. This ferrule is formed at its free end with internal and external screw-threads, the inner screw-threads to receive and hold a block of erasive material. The outer screw-threads of the ferrule receive the screw-threaded end of a supplemental and removable ferrule or sleeve, which in turn carries at its outer end a block of erasive material. By this means the primary eraser-tip is protected from dirt so long as the supplemental removable ferrule is in place on the first ferrule, so that the erasive material carried by the supplemental ferrule may be employed for erasive purposes until worn out, which usually occurs before the pencil is more than half used up, after which the supplemental ferrule may be unscrewed and thrown away, when a fresh and clean block of erasive material will still be available and in most cases will last until the lead-pencil is all used up. All this will appear from the following detailed description, taken in connection with the accompanying drawings, in which—

Figure 1 is a side view of a lead-pencil constructed in accordance with my invention with the supplemental ferrule in place. Fig. 2 is a similar view showing the supplemental ferrule removed. Fig. 3 is an enlarged longitudinal section through the end of the pencil carrying the ferrules, and Fig. 4 is a longitudinal section of a point-protector constructed in accordance with my invention and applied to a pencil.

Referring to Figs. 1, 2, and 3 of the drawings, there is shown a lead-pencil 1 of ordinary construction. One end of the pencil is formed into a tenon 2, which receives one end of a metallic ferrule 3, the free end of which is shaped into a screw-thread 4 on both the outer and inner surfaces. On the portion of the ferrule 3 surrounding the tenon 2 there is formed a circumferential bead 5, the purpose of which will hereinafter appear, and indentations 6, adjacent to this bead, serve to secure the ferrule to the tenon 2 in the usual manner. A block 7, of rubber or other suitable erasive material, is forced part way into the threaded end of the ferrule 3 and is there held by the inwardly-projecting screw-threads 4. The portion of the erasive block which projects beyond the ferrule is intended for use in the ordinary manner. The ferrule 3 and the block 7 correspond to the ordinary metallic ferrule and eraser with which the better grade of lead-pencils are supplied.

Ordinarily, because of the nature of the material used, these rubber erasive blocks project only about one-fourth of an inch beyond the ferrule carrying them, and it often happens that long before the pencil has been used up the rubber eraser-block has been worn down to the end of the ferrule, and its utility is then lost.

In order to provide a larger amount of erasive material for each pencil than is practicable with the simple metallic eraser-carrying ferrule, I provide a supplemental ferrule 8, which at one end 9 is shaped to receive and retain a block 10, of erasive material, and near the other end has a threaded portion 11, which merges into a plain cylindrical portion 12.

The supplemental ferrule 8 is of such size that it may be screwed onto the ferrule 3, the thread 11 of the former fitting the thread 4 of the latter, while the smooth cylindrical portion 12 of the ferrule 8 passes over and beyond the thread 4 until it finally abuts against the bead 5, which therefore acts as a stop for the supplemental ferrule 8.

When a pencil so equipped is first used, the supplemental ferrule 8 is in place on the pencil, and the erasive block 10 is the only one exposed for use. The erasive block 10 ultimately becomes worn until it is no longer fit for use, and the user then unscrews the ferrule 8 and throws it away, exposing a fresh clean unused eraser, and so far as this particular pencil is concerned the erasing end is quite new, and the utility of the pencil in this respect is thus prolonged. The pencil as a whole is therefore much more useful than when provided only with the ordinary eraser-tip.

It is evident that one of the two eraser-blocks may be of the kind which is capable of erasing lead-pencil marks only, while the other eraser-block—say the protected block 7—may be made of an abrasive material, such as is used for erasing ink-marks and which is generally known as a "rubber ink-eraser," so that the pencil may be used for erasing pencil-marks when the supplemental ferrule 8 is in place and may be used for erasing both ink-marks and pencil-marks when the supplemental ferrule 8 is temporarily removed for this special purpose or when it is finally removed, as above set forth.

As hereinbefore stated, the primary ferrule need not be fast on the lead-pencil, but may be removable therefrom to serve as a point-protector. This is indicated in Fig. 4, where the pencil 1 is shown with a point-protector 3' of ordinary construction. The free end of this point-protector is formed with the screw-threads 4 and bead 5 and carries the erasive block 7 precisely the same as shown in the other figures of the drawings. It also receives the supplemental ferrule 8, with its erasive block 10.

Having thus described my invention, what I claim, and desire to secure by Letters Patent, is—

1. A lead-pencil provided with an eraser-carrying ferrule, and having removably applied to said ferrule, and protecting said eraser, another or supplemental ferrule carrying an erasive block exposed for use, substantially as described.

2. A lead-pencil having permanently fixed on one end an eraser-carrying ferrule, and having removably applied to said ferrule, and protecting said eraser, another or supplemental ferrule carrying an erasive block exposed for use, substantially as described.

3. A lead-pencil provided with a ferrule having its free end formed with a screw-thread and there receiving and holding a block of erasive material, and a supplemental ferrule threaded to screw onto the primary ferrule and serving to cover and protect the erasive block carried by said primary ferrule, the said supplemental ferrule also carrying a block of erasive material exposed for use, substantially as described.

4. A lead-pencil having permanently fixed on one end thereof a ferrule having its free end formed with a screw-thread and there receiving and holding a block of erasive material, and a supplemental ferrule threaded to screw onto the permanent ferrule and serving to cover and protect the erasive block carried by said permanent ferrule, the said supplemental ferrule also carrying a block of erasive material exposed for use, substantially as described.

5. The combination with a ferrule carrying an erasive block at one end, of another or supplemental ferrule, carrying an erasive block at one end and having the other end shaped to fit over and be temporarily secured to the eraser end of the primary ferrule, substantially as described.

In testimony whereof I have signed my name to this specification in the presence of two subscribing witnesses.

LOUIS J. RECKENDORFER.

Witnesses:
MORRIS J. LEONHARDT,
GEORGE D. DICKEISSEN.